(12) United States Patent
Wegemann

(10) Patent No.: US 9,128,181 B2
(45) Date of Patent: Sep. 8, 2015

(54) METHOD FOR MONITORING AND METHOD FOR OPERATING A FILL LEVEL SENSOR SYSTEM USING THE RADAR PRINCIPLE AND A CORRESPONDING FILL LEVEL SENSOR

(75) Inventor: Uwe Wegemann, Sprockhövel (DE)

(73) Assignee: KROHNE Messtechnik GmbH, Duisburg (DE)

(*) Notice: Subject to any disclaimer, the term of this patent is extended or adjusted under 35 U.S.C. 154(b) by 380 days.

(21) Appl. No.: 13/549,744

(22) Filed: Jul. 16, 2012

(65) Prior Publication Data

US 2013/0213132 A1 Aug. 22, 2013

(30) Foreign Application Priority Data

Feb. 22, 2012 (DE) .......................... 10 2012 003 373

(51) Int. Cl.
*G01F 23/28* (2006.01)
*G01S 13/34* (2006.01)
*G01F 25/00* (2006.01)
*G01S 7/40* (2006.01)
*G01F 23/284* (2006.01)

(52) U.S. Cl.
CPC .............. *G01S 13/343* (2013.01); *G01F 23/284* (2013.01); *G01F 25/0061* (2013.01); *G01S 7/4004* (2013.01); *G01S 2007/4091* (2013.01)

(58) Field of Classification Search
CPC ................................ G01F 23/28; G01F 23/284
USPC ............. 73/290 R, 290 V; 342/118, 123, 124, 342/194, 195, 196
See application file for complete search history.

(56) References Cited

U.S. PATENT DOCUMENTS

| 4,743,910 A | 5/1988 | Hill et al. |
| 5,751,240 A * | 5/1998 | Fujita et al. ..................... 342/70 |
| 6,278,398 B1 * | 8/2001 | Vossiek et al. ................ 342/128 |
| 6,679,115 B2 * | 1/2004 | Heidecke .................... 73/290 V |
| 8,493,265 B2 * | 7/2013 | Cornic et al. ................. 342/196 |
| 2005/0168379 A1 * | 8/2005 | Griessbaum et al. .......... 342/124 |
| 2010/0031753 A1 * | 2/2010 | Mayer et al. ..................... 73/861 |
| 2012/0050093 A1 | 3/2012 | Heilmann et al. |
| 2012/0242530 A1 | 9/2012 | Luebbert et al. |
| 2014/0028492 A1 * | 1/2014 | Mayer et al. .................. 342/124 |
| 2014/0085132 A1 * | 3/2014 | Jirskog et al. ................. 342/124 |

FOREIGN PATENT DOCUMENTS

DE 10 2009 057 191 A1 6/2011

* cited by examiner

*Primary Examiner* — Hezron E Williams
*Assistant Examiner* — Hoang Nguyen
(74) *Attorney, Agent, or Firm* — Roberts Mlotkowski Safran & Cole, P.C.; David S. Safran

(57) ABSTRACT

A method for monitoring the operability of a fill level sensor acting as a FMCW radar device in which the frequency of a radar signal to be sent from the fill sensor during measurement of a fill level of a medium is modulated with a set of pre-settable measuring parameters and a measured value of the fill level determined from at least one received signal received during measurement of the fill level. The method enables simple automatic monitoring of the operability of a fill level sensor acting as a FMCW radar device in that, during a test phase, the frequency of the radar signal to be sent is modulated with at least one set of pre-settable test parameters and a test measured value is determined from at least one test received signal received during the test phase, which is evaluated to establish the operability of the fill level sensor.

9 Claims, 3 Drawing Sheets

METHOD FOR MONITORING AND METHOD FOR OPERATING A FILL LEVEL SENSOR SYSTEM USING THE RADAR PRINCIPLE AND A CORRESPONDING FILL LEVEL SENSOR

BACKGROUND OF THE INVENTION

1. Field of the Invention

The invention relates to a method for monitoring a fill level sensor acting as a Frequency Modulated Continuous Wave (FMCW) radar device, wherein the frequency of a radar signal to be sent from the fill sensor during measurement of a fill level of a medium is modulated with a set of pre-settable measuring parameters, and wherein a measured value of the fill level is determined from at least one received signal received during measurement of the fill level. Furthermore, the invention relates to a method for operating a fill level sensor acting as a FMCW radar device, wherein the frequency of a radar signal to be sent from the fill level sensor during measurement of a fill level of a medium is modulated with a set of pre-settable measuring parameters and wherein a measured value of the fill level is determined from at least one received signal received during measurement of the fill level. Additionally, the invention relates to a fill level sensor acting as a FMCW radar device.

2. Description of Related Art

Radar fill level sensors are often used in industrial measuring technology for determining the fill level of media, such as liquids, bulk goods or also slurries, in containers, such as tanks or silos. The running-time method implemented by the measuring devices is based on the physical law that the course of, e.g., an electromagnetic signal is equal to the product of running time and propagation speed. In the case of measuring the level of a medium—for example, a liquid or bulk goods—in a container, the course corresponds to twice the distance between an antenna emitting and receiving an electromagnetic signal and the surface of the medium. The wanted echo signal—i.e., the signal reflected on surface of the medium—and its running time are determined using the so-called echo function or the digitalized envelope function. The envelope function represents the amplitudes of the echo signals as a function of the distance "antenna—surface of medium". The fill level can be calculated using the difference between the known distance from the antenna to the floor of the container and the distance from the surface of the medium to the antenna determined by the measurement. The emitted and received electromagnetic signals are mostly microwave radiation.

A special radar fill level method is the FMCW radar method. A microwave signal is continuously emitted for the measurement, wherein the frequency of the signal is modulated with a certain set of modulation parameters. Typically, this happens in successive ramps as the shape of the course of the modulation, whose modulation deviation—i.e., the difference between the smallest and greatest frequency—and modulation duration—i.e., the amount of time it takes for the modulation deviation to occur—can be provided. Due to the lag time during signal propagation, the emission frequency is changed when the reflected signal is received, so that the distance of the reflected surface and thus the fill level result from the difference frequency. In the prior art, a process is used for this that is known as mixing, through which a signal with considerably lower frequency is generated within the duration of the tuning or modulation of the radar signal to be emitted. A discrete Fourier transformation is mostly used for further processing.

It is described in German Patent Application DE 10 2009 057 191 A1 that measurement accuracies can be achieved in different distance ranges using different parameters of modulation of the frequency. It can be seen in German Patent Application DE 10 2009 057 191 A1 that sets of modulation parameters can be optimized in that they are either more suitable for the actual measurement or for acknowledging a blindness of the radar sensor.

The above-mentioned fill level sensors find application, e.g., in the chemical industry, in water and wastewater treatment, in the pharmaceutical industry, in the food sector, in power generation as well as in the oil and gas industries. In particular for applications that need a certain amount of safety, the used measuring devices strive for functional safety (classified into safety integrity level classes SIL 1 to 4). The safety constructional principles that are to be followed to minimize the risk of failed functioning of the measurement device result from the desired safety level.

Known methods exist for the redundant or diverse design of the measurement device. This means that components are designed twice or more, or respectively, come from different manufacturers or are of different types. Increased costs are involved in both instances. In the redundant design, the spatial requirements of the components increase or, respectively, units must be provided that respectively control the redundant components or evaluate their signals. Additionally, the time required for measurement can increase, since the results are compared, or respectively, errors are acknowledged. One measure for evaluating a measurement device in view of safety is the safe failure fraction (SFF), which indicates the portion of safe failures of the total possible failures. A safe failure is a failure that is relevant in terms of safety, however is either acknowledged or is transmitted to the transmitter in a safe state. It is of great advantage when failures are acknowledged by the measurement device by automatic monitoring.

SUMMARY OF THE INVENTION

Thus, the object of the invention is to provide a method for monitoring a fill level sensor acting as a FMCW radar device, a method for operating a fill level sensor acting as a FMCW radar device and a fill level sensor acting as a FMCW radar device, which allow for automatic monitoring of the operating condition of the fill level sensor that is as simple as possible.

The method according to the invention for monitoring, i.e., to test whether a fill level sensor acting as a FMCW radar device is working correctly is initially and essentially characterized by the following steps: the frequency of the radar signal to be sent is modulated with at least one set of pre-settable test parameters during a test phase. A test measured value is determined of at least one test received signal received during the test phase and at least the test measured value is evaluated in order to implement monitoring of the operating condition of the fill level sensor. The radar signal to be sent is modulated with a set of pre-settable measurement parameters according to the FMCW method. During the test phase, modulation, however, occurs with at least one set of pre-settable known test parameters, which differ in particular from the set of measurement parameters in at least one parameter. The test measured values resulting from measurement with the set of test parameters is then evaluated to establish whether or not the fill level sensor is working correctly.

An advantageous design is provided in that the frequency of the radar signal to be sent is modulated with different sets of pre-settable test parameters during the test phase, wherein at least one set of test parameters differs from the set of measurement parameters. Furthermore, at least one associated test received signal is received for each of at least two sets of test parameters and an assigned test measured value is determined from the at least two test received signals. Then, the at least two test measured values are evaluated to establish whether or not the fill level sensor is working correctly. During a test phase, multiple, i.e., at least two measurements are made with different sets of test parameters. In particular, one set of test parameters is different than the set of measurement parameters. Different reflected radar signals can be received with the different parameters, from which, in turn, different test measured values are determined. The at least two test measured values can then be further processed for monitoring the working condition of the fill level sensor. In one design, the frequency of the radar signal to be sent is modulated with at least one set of test parameters essentially identical to the set of measurement parameters during the test phase. In an alternative design, the above second set of test parameters differs from the set of measurement parameters.

An advantageous design is dedicated to the evaluation of the test measured value or test measured values. Here, the at least one test measured value is compared to at least one actual measured value of the fill level associated with the test phase to establish the conditions for monitoring the condition of the fill level sensor. In particular, a difference value is determined between the at least one test measured value and the actual measured value associated with the test phase. This design is one of possible designs in that the at least one actual measured value of the fill level associated with the test phase is determined during or before or after the test phase. The associated actual measured value of the fill level, i.e., the current measured value (insofar as there is no failure that makes an actual measurement impossible) is determined before or after the test phase or in one design during the test phase, in that, for example, a test measurement, or respectively, a measurement as part of a test phase—as described above—is carried out with the set of test parameters that is the same as the set of measurement parameters for a normal measurement. If the difference of the test measured value relative to the associated actual measured value of the fill level is formed for the evaluation, different values are set depending on the modulation parameters.

It is provided in an embodiment in conjunction with the above design that at least one dependency of the test measured value from the actual measured value of the fill level associated with the test phase is determined for evaluating the at least one test measured value to establish the parameters for monitoring. Then, the determined dependency is compared with a dependency provided for the fill level sensor. In this design, the dependency of the measured test measure value on the preset actual measured value of the fill level is determined. For example, as mentioned above, the difference between preset actual measured value and test measured value is determined. The relation resulting from this is compared to a provided target correlation and the adjusting comparison result is used for monitoring of the measurement device. If, for example, deviations occur between the dependencies beyond a preset measure, this can be interpreted as a presence of a failure in the measurement device.

In a further embodiment, the above-mentioned designs are pursued. Here, it is provided that at least one sequence of dependencies of the test measured value from the actual measured value of the fill level associated with the test phase is determined for the evaluation of the at least two test measured values, which are each associated with another set of test parameters and the determined sequence of dependencies is compared with a sequence provided for the fill level sensor.

Alternatively or additionally, the design comprises at least one sequence of dependencies of the test measured value is determined from one another for the evaluation of the at least two test measured values and the determined sequence of dependencies is compared with a sequence provided for the fill level sensor. In the design, the pattern of the sequence of the correlation between one test measured value and the actual measured value associated with the test phase or the correlation of the test values with one another are each compared with a provided sequence and evaluated for setting the monitoring parameters. How the test measured values change depending on the different modulation parameters is determined in this case. The pattern of the sequence of dependencies from the actual measured value, or respectively, from the test measured value, are compared among themselves with provided data for monitoring the operating condition of the fill level sensor.

The above derived and described object is met in a further teaching of the invention with a method mentioned in the introduction for operating a fill level sensor acting as a FCMW radar device by a sequence of at least the following steps:

During an initializing phase, the frequency of the radar signal to be sent from the fill level sensor is modulated with at least one set of pre-settable initializing parameters. An initializing measured value is determined from at least one initializing received signal received during the initializing phase. Then, a dependency of the initializing measured value from an initializing value is determined, e.g., calculated. Finally, at least the determined dependency is provided as standard dependency, i.e., for example, saved in data storage.

The initializing value, from which the dependency of the initializing measured value resulting from modulation with the set of initializing parameters is determined, is an actual measured value of the fill level in one variation, which is associated with the initializing phase. The actual measured value is—as in the above monitoring method—preferably the measured value that corresponds to the present fill level of the medium during the initializing phase.

In a further design, during the initializing phase, multiple sets of modulation parameters are dedicated to designing a corresponding amount of different measured values. The other value is then another initializing measured value. Accordingly, the dependencies of the initializing measured value in this design are determined from one another and provided as standard dependencies.

The initializing phase is thus designed analogous to one of the above embodiments of the monitoring method. In the test phases following the initializing phase, for example, the embodiments of the method for monitoring discussed above are used. Such an initializing phase can, for example, be carried out before the actual beginning of operation of a new measurement device.

One embodiment provides, in particular, that the frequency of the radar signal to be sent during a test phase is modulated with at least one set of pre-settable test parameters, wherein the at least one set of test parameters is essentially the same as the set of initializing parameters. A test measured value is determined from at least one test received signal received during the test phase and at least one dependency of the test measured value is determined from one additional value. Then, the dependency determined during the test phase is compared with the standard dependency, and based on this comparison, conclusions can be made about the state of the measurement device, i.e., about its lack of failure or faultiness. The other value is—as described above in the initializing phase—either an actual measured value of the fill level associated with the test phase or the other value results from the other test measured values during a sequence of different sets of modulation parameters. The sets of test parameters, here, are the same as the sets of the initializing parameters in one design. This allows for a simple comparison of dependencies. In particular, when using multiple sets of modulation parameters, a pattern of dependencies of each fill level sensor is determined and stored during initialization compared with each received dependency during the test phase. Both variations described above can be combined with one another for defining the "other value".

Furthermore, the above derived and described object is met in a further teaching of the invention by a fill level sensor acting as a FMCW radar device as described in the introduction in that it is operated according to one of the designs described above for the method of operation and/or that it is monitored according to one of the designs described above for the method of monitoring. Here, the parameters (which form each set of measurement, test or initializing parameters) with which the frequency of the radar signals are modulated, in particular a form of modulation, e.g., ramp-shaped, include a modulation of the duration, a modulation of the frequency deviation or the choice between a discrete or, respectively, step-wise or a continual modulation.

In detail, there is a plurality of possibilities for designing and further developing the method according to the invention for monitoring a fill level sensor acting as a FMCW radar device, the method according to the invention for operating a fill level sensor acting as a FMCW radar device and the fill level sensor according to the invention acting as a FMCW radar device. Here, reference should be to the following description of embodiments in conjunction with the drawings.

DETAILED DESCRIPTION OF THE INVENTION

Figure 1:
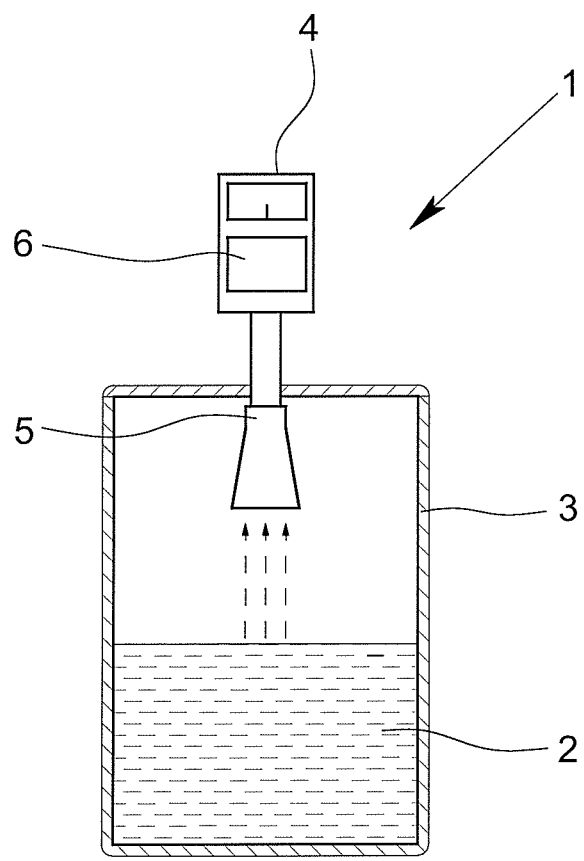
FIG. 1 is a schematic representation essentially illustrating the functional correlations using a block diagram of a measuring arrangement for a container having a fill level sensor according to the invention.
Figure 2:
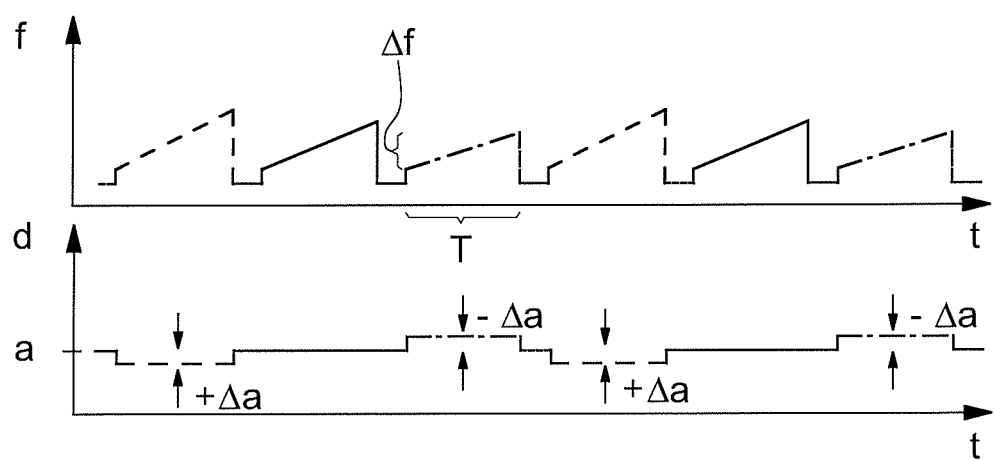
FIG. 2 shows a schematic sequence of modulations of the frequency of the radar signal and the associated measured values resulting out of it and FIG. 3 is an exemplary flow chart for a sequence of the method according to the invention for operation a FMCW radar fill level sensor.
Figure 3:
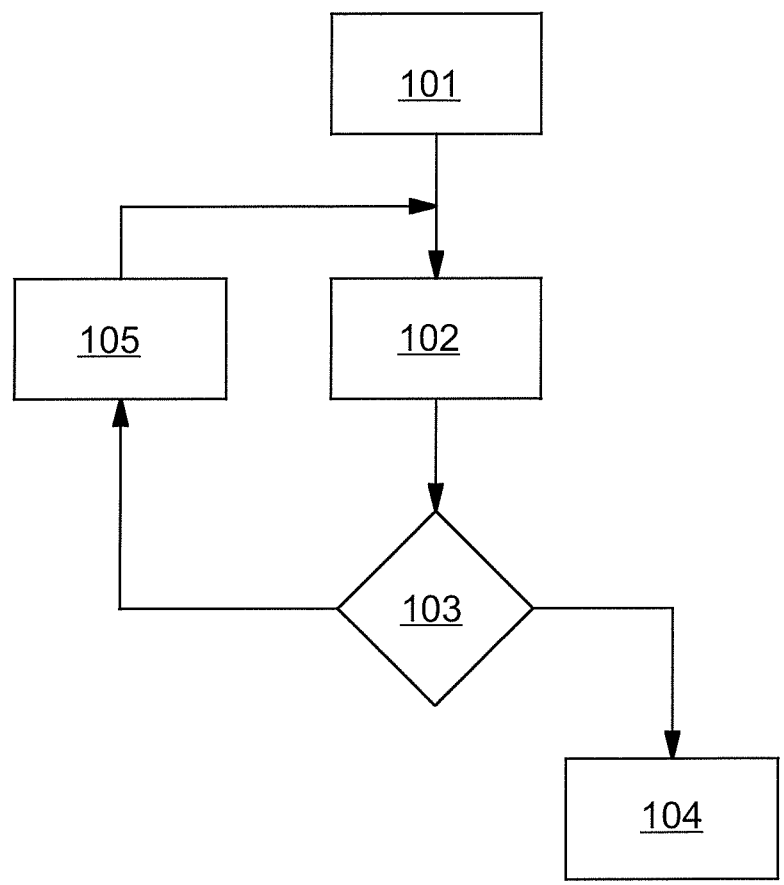

A measuring arrangement for measuring a fill level of a medium in a container with a fill level sensor according to the invention is shown in FIG. 1. The course of the modulation of the frequency of the radar signal and the associated distance values are shown in FIG. 2. FIG. 3 shows a possible sequence of the steps of the method according to the invention for operating a fill level sensor. Here, only the correlation between the different components or steps can be acknowledged.

FIG. 1 the measurement device 1, which is operated as a FMCW radar measurement device and that serves for determining the fill level of the medium 2 in the container 3. The medium 2 is, for example, a liquid that is located in a tank as container 3. The measurement device 1 has an electronic unit 4—here, as an example, with a schematically depicted display unit—, which generates radar signals to be emitted toward the surface of the medium and evaluates radar signals received again after being reflected by the medium—indicated in the drawing as arrows. Furthermore, an antenna 5 is provided for emitting and receiving radar signals. The electronic unit 4 is, in particular, designed in such a manner that it modulates the frequency of the radar signal to be emitted. A data storage 6 is provided in the electronic unit 4, in which, during the initializing phase, the dependencies to be determined of the test measured values from the actual measured value of the fill level associated with the test phase and/or the dependencies of the test measured values from one another and/or the corresponding sequences of the dependencies are stored as patterns.

In FIG. 2 the upper graph shows the course of modulation of the frequency of the radar signal to be emitted. Two groups with three different sets each (one dotted, one solid and one dashed and dotted line) of modulation parameters are shown. Each middle modulation profile (solid line) is formed with the set of measurement parameters. That means that the given actual measurement value a of the distance to the medium results with this modulation. The modulation deviation, i.e., the frequency range, over which is modulated, is greater in the previous profile (dotted line) and is smaller in the following profile (dashed and dotted line) than in the set of measurement parameters. The ramp shape and the amount of time it takes for the modulation to occur are each the same in the individual sets of modulation parameters. Likewise, in each case, a linear and continual increase of the frequency should be generated. The lower graph shows the fill level d of the medium (=tank height−distance a), which results from the measured values of a total of six measurements here. The middle values with the set of modulation parameters optimized for the measurement yields the value a in each case. The previous or, respectively, following sets of test parameters lead to distances (+Δa) that are too large or distances (−Δa) that are too small. A pattern of the dependencies associated with each set of modulation parameters can be obtained from the relation of the test measured values to one another or, respectively, to an actual measured value. The test measured values showing deliberately "false" measured values for the fill level depending on the sets of modulation parameters and being obtained during the test phase and thus being test measured values. If another pattern or another dependency results from a test phase, this is the result of something being changed in the measurement device or that a failure is present.

Put another way, during the monitoring phase, the frequency of the radar signals is modulated with a set of test parameters and from at least one received signal a test measured value is determined. This test measured value is a type of wrong value of the fill level which differs from the real value of the fill level because the frequency of the radar signals was modulated with the set of test parameters. Since the set of test parameters is known and it is also known how this set should affect the test measured value in the case of a correctly working fill level sensor, with this knowledge, the test measured value is evaluated for the purpose of monitoring the operability of the fill level sensor. For example: if the test measured value differs from an expected value, then the fill level sensor is not correctly working or is not in a proper condition.

For the FMCW fill level sensor in the embodiment according to FIG. 2, in which the frequency of the emitted radar signal is linearly modulated along a ramp, the following known relation between the distance a from the antenna 5 to the surface of the medium 2, the modulation deviation Δf, the modulation duration T and the measured difference frequency $f_m$ between emitting and receiving signal, wherein c is the propagation speed of the radar signal is valid:

$$a = f_m \cdot \frac{c}{2} \cdot \frac{T}{\Delta f}.$$

A set of modulation parameters—and thus, a set of measurement parameters and test parameters—thus shows the modulation deviation Δf and the modulation duration T. In the test shown in FIG. 2, only the modulation deviation Δf is used and varied as test parameter. The modulation deviation Δf is thus physically changed during test operation—the emitted radar signal really runs through a greater or smaller frequency deviation—, the parameters in the calculation according to the above equation, however, remain unchanged, so that the deviation +−Δa is set.

An exemplary course of the method according to the invention for operating a fill level sensor acting as a FCMW radar device is shown in FIG. 3.

During the initializing phase, the values are determined in step 101 for the fill level of the medium resulting from the received radar signals, when the emitted radar signals are modulated with at least one set of modulation parameters. If, for example, three sets are used, then three different signals can be received, for which, in turn, three different values can be determined. Thus, three values for the fill level of the medium result from the three known sets of parameters. If, as for example, in FIG. 2, a set of test parameters is the same as a set of measurement parameters, then the determined value is the same as the current given fill level of the medium. Alternatively, a value, which would result from a normal measurement or would be determined before the initializing phase, can be given into the measurement device. Either the relation to the current, i.e., real actual value can be determined using the three values or the relationships of the values to one another, e.g., the relation of the first to the second and the second to the third value, can be determined and appropriately saved. The relations of the values to one another or to the real present fill level value are desired relations or desired dependencies for monitoring or controlling the fill level sensor.

In step 102, the radar signal to be emitted is modulated in a mounted fill level sensor with—in the example being discussed here—three sets of parameters and three test measured values are determined from the three received signals. This is for the case that the sets of test parameters are the same as the sets of initializing parameters and that, for example, also the sequence of the sets is the same. Different designs of the sets or of the sequences are included in the scope of the invention, however, they could increase the evaluation effort.

In step 103, the sequence of the dependencies of the three test measured values determined from testing of associated—i.e., determined during the test phase—actual measured values of the fill level with sequences provided during the initializing phase are compared, from which a test result is determined.

Based on the test result, a failure alert occurs in step 104—due to a deviation of the determined sequence from the provided pattern—or, in step 105, a measurement is taken or pre-settable amounts of measurements of the fill level are taken. Monitoring with step 102 follows step 105 in the example shown here. The monitoring method according to the invention includes, in the shown example, the steps 102 and 103 or 104 as possible results of monitoring of the operability of the fill level sensor. The shown course is only an example for the monitoring method according to the invention or for the method of operating the fill level sensor.

In this manner, for example, at least one test phase can be carried out after each measurement.

What is claimed is:

1. Method for monitoring the operability of a fill level sensor acting as a FMCW radar device using an electronic unit having radar transmitting, receiving and evaluation circuitry/processors for analyzing and evaluating measured data to assess the integrity/reliability of the fill level sensor, comprising the steps of:
   modulating frequency of a radar signal to be sent from the fill sensor during measurement of a fill level of a medium with a set of pre-settable measuring parameters, and
   determining a measured value of the fill level from at least one received signal received during measurement of the fill level,
   wherein, during a test phase, the frequency of the radar signal to be sent is modulated with at least one set of pre-settable test parameters,
   wherein at least one test measured value is determined from at least one test received signal received during the test phase and
   wherein the at least one test measured value is evaluated to determine the operability of the fill level sensor
   wherein, during the test phase, the frequency of the radar signal to be sent is modulated with different sets of pre-settable test parameters, wherein at least one set of test parameters differs from the set of measuring parameters, wherein at least one associated test received signal is received for each of at least two sets of test parameters, wherein an associated test measured value is determined from each of at least two test received signals, and wherein at least the at least two test measured values are evaluated for determining whether or not the fill level sensor is working correctly.

2. Method according to claim 1, wherein during the test phase, the frequency of the radar signal to be sent is modulated with at least one set of test parameters that is essentially identical to at least one set of measuring parameters.

3. Method for monitoring the operability of a fill level sensor acting as a FMCW radar device using an electronic unit having radar transmitting, receiving and evaluation circuitry/processors for analyzing and evaluating measured data to assess the integrity/reliability of the fill level sensor, comprising the steps of:
   modulating frequency of a radar signal to be sent from the fill sensor during measurement of a fill level of a medium with a set of pre-settable measuring parameters, and
   determining a measured value of the fill level from at least one received signal received during measurement of the fill level,
   wherein, during a test phase, the frequency of the radar signal to be sent is modulated with at least one set of pre-settable test parameters,
   wherein at least one test measured value is determined from at least one test received signal received during the test phase and
   wherein the at least one test measured value is evaluated to determine the operability of the fill level sensor
   wherein the at least one test measured value is set in relation to at least one actual measured value of the fill level associated with the test phase.

4. Method according to claim 3, wherein the at least one actual measured value of the fill level associated with the test phase is determined.

5. Method according to claim 3, wherein at least one actual measured value of the fill level associated with the test phase dependent on the test measured value is determined for evaluating of the at least one test measured value and wherein the determined dependency is compared with a dependency provided for the fill level sensor.

6. Method according to claim 1, wherein the at least one test measured value is set in relation to at least one actual measured value of the fill level associated with the test phase and wherein, for the evaluation of the at least two test measured values for monitoring of the fill level sensor, at least one sequence of dependencies of the test measured values is determined from the actual measured value of the fill level associated to the test phase and the determined sequence of dependencies is compared with a sequence provided for the fill level sensor.

7. Method according to claim 1, wherein the at least one test measured value is set in relation to at least one actual measured value of the fill level associated with the test phase and wherein, for the evaluation of the at least two measured values, at least one sequence of dependencies of the test measured values is determined from one another and the determined sequence of dependencies is compared with a sequence provided from the fill level sensor.

8. Method for operating a fill level sensor acting as a FMCW radar device using an electronic unit having radar transmitting, receiving and evaluation circuitry/processors for analyzing and evaluating measured data to assess the integrity/reliability of the fill level sensor, comprising the steps of:

modulating a frequency of a radar signal sent from the fill level sensor during measurement of a fill level of a medium with a set of pre-settable measuring parameters and determining a measured value of the fill level from at least one received signal received during measurement of the fill level, wherein, during an initializing phase, the frequency of the radar signal to be sent from the fill level sensor is modulated with at least one set of pre-settable initializing parameters, wherein an initializing measured value is determined from at least one initializing received signal received during the initializing phase, wherein a dependency of the initializing measured value is determined from an initializing value and wherein at least the determined dependency is provided as standard dependency.

9. Method according to claim 7, wherein the frequency of the radar signal to be sent during a test phase is modulated with at least one set of pre-settable test parameters, wherein the at least one set of test parameters is essentially the same as the set of initializing parameters, wherein a test measured value is determined from at least one test received signal received during the test phase, wherein at least one dependency of the test measured value is determined from a further value and wherein the determined dependency is compared to the provided standard dependency.

* * * * *